(12) United States Patent
Vögeli (10) Patent No.: US 8,456,786 B2
(45) Date of Patent: Jun. 4, 2013

(54) BRIDGING UNIT

(75) Inventor: Andreas Vögeli, Döttingen (CH)

(73) Assignee: ABB Schweiz AG, Baden (CH)

( * ) Notice: Subject to any disclaimer, the term of this patent is extended or adjusted under 35 U.S.C. 154(b) by 260 days.

(21) Appl. No.: 13/071,184

(22) Filed: Mar. 24, 2011

(65) Prior Publication Data

US 2011/0235221 A1 Sep. 29, 2011

(30) Foreign Application Priority Data

Mar. 25, 2010 (EP) ..................................... 10157722

(51) Int. Cl.
*H02H 3/20* (2006.01)
*H02H 9/04* (2006.01)
*H02H 7/00* (2006.01)
*H02H 9/00* (2006.01)

(52) U.S. Cl.
USPC ........................................... 361/91.1; 361/18

(58) Field of Classification Search
USPC .......................................................... 361/91.1
See application file for complete search history.

(56) References Cited

U.S. PATENT DOCUMENTS

| 5,986,909 | A | 11/1999 | Hammond et al. | |
|---|---|---|---|---|
| 2006/0274468 | A1* | 12/2006 | Phadke | 361/93.1 |
| 2010/0066174 | A1 | 3/2010 | Dommaschk et al. | |
| 2010/0144537 | A1* | 6/2010 | Kawashima | 505/211 |

FOREIGN PATENT DOCUMENTS

| DE | 103 23 220 A1 | 12/2004 |
|---|---|---|
| GB | 1 163 507 A | 9/1969 |
| WO | WO 2007/023064 A1 | 3/2007 |
| WO | WO 2008/067786 A1 | 6/2008 |
| WO | WO 2008/125494 A1 | 10/2008 |
| WO | WO 2009/092621 A1 | 7/2009 |

OTHER PUBLICATIONS

European Search Report issued on Oct. 1, 2010 (with English language translation of category of cited documents).

* cited by examiner

*Primary Examiner* — Dharti Patel
(74) *Attorney, Agent, or Firm* — Buchanan Ingersoll & Rooney PC (57) ABSTRACT

A converter cell of a modular converter is provided. The converter cell includes a bridging unit which has a mechanical bistable relay, an electronic switch, a drive for switching the relay and the electronic switch, and an energy store for supplying power to the mechanical relay, the electronic switch and the drive. The drive includes passive overvoltage detection configured to charge the energy store if the overvoltage is exceeded. The drive includes an additional switch which is closed when a voltage on the energy store exceeds a predefined value, and the drive supplies current from the energy store to at least one of the relay and the electronic switch. The drive has hysteresis, such that, if the voltage on the energy store is undershot, at least one of the relay and the electronic switch is still supplied with current from the energy store.

27 Claims, 3 Drawing Sheets

BRIDGING UNIT

RELATED APPLICATIONS

This application claims priority under 35 U.S.C. §119 to European Patent Application No. 10157722.9 filed in Europe on Mar. 25, 2010, the entire content of which is hereby incorporated by reference in its entirety.

FIELD

The present disclosure relates to the field of power electronics. More particularly, the present disclosure relates to a bridging unit for shorting a converter cell, to a converter cell, to a converter, and to a method for shorting a converter cell.

BACKGROUND INFORMATION

Certain types of converters such as modular multi-level converters (M2LC converters), for example, may have a plurality of converter cells which include power-electronic switches by means of which the current to be switched by the converter is switched. In cells such as these, however, one or more of the cells in a converter may need to be bypassed or shorted. This may be the case, for example, when an overcurrent or an overvoltage is present on one cell or a plurality of cells, which can be caused by an external fault (for example, a ground fault) or by an internal fault in the converter cell.

In the event of a significant internal fault in the converter cell, it may be advantageous for the converter cell to be permanently bridged. A pyrotechnic make contact (WO 2009/092621 A1), a vacuum interrupter (WO 2008/125494 A1), or else broken-down semiconductor components (DE 103 232 20 A1, WO 2007/023064) have already been proposed for this purpose.

In the event of external faults, it may be necessary to pass surge currents briefly through the bridging unit and for such surge currents to have to bypass the converter cell. For this purpose, it has been proposed that, for example, a thyristor be arranged in parallel with the freewheeling diode for the converter switches (WO 2008/067786 A1).

Non-resettable bridging units (for example, a pyrotechnic make contact or broken-down components) must be removed from the converter cells, and replaced by new bridging units which have not yet been used, and this involves effort. This removal and replacement process may be highly time-consuming and costly.

Thyristors are also subject to the problem that the bridging unit returns to the open state without external power. A complete power failure of the converter would in this case also switch the bridging units of defective cells back to the switched-off state again.

GB 1 163 507 A specifies a bridging unit of this generic type for shorting a first input and a second input of a converter cell in a converter. Furthermore, U.S. Pat. No. 5,986,909 discloses a bridging unit for a converter cell by means of a relay.

SUMMARY

An exemplary embodiment of the present disclosure provides a bridging unit for shorting a first input and a second input of a converter cell of a modular converter. The exemplary bridging unit includes a bistable mechanical relay, a power-electronic switch, a drive for switching the relay and the power-electronic switch, and an energy store for supplying power to the mechanical relay, the power switch and the drive. The bistable mechanical relay is configured to electrically connect the first input to the second input. The power-electronic switch is configured to electrically connect the first input to the second input. The drive includes passive overvoltage detection configured to charge the energy store if the overvoltage is exceeded. The drive includes a further electronic switch, which is configured to be closed when a voltage on the energy store exceeds a predefined value, and the drive is configured to supply current from the energy store to at least one of the bistable relay and the power-electronic switch. The drive has hysteresis, such that, if the voltage on the energy store is undershot, at least one of the relay and the power-electronic switch is still supplied with current from the energy store.

An exemplary embodiment of the present disclosure also provides a method of shorting a converter cell of a modular converter with a bridging unit. The bridging unit includes a bistable mechanical relay for electrically connecting first and second inputs of the converter cell, a power-electronic switch for electrically connecting the first and second inputs, a drive for switching the relay and the power-electronic switch, and an energy store for supplying power to the mechanical relay, the power switch and the drive. The exemplary method includes receiving or determining a closing signal by the drive on the basis of the identification of at least one of an overvoltage and an overcurrent at the inputs of the converter cell or of an external signal. The exemplary method also includes closing the power-electronic switch by the drive in reaction to the closing signal, and closing the bistable mechanical relay by the drive in reaction to the closing signal. In addition, the exemplary method includes receiving power from the energy store to close at least one of the power-electronic switch and the bistable mechanical relay.

BRIEF DESCRIPTION OF THE DRAWINGS

Additional refinements, advantages and features of the present disclosure are described in more detail below with reference to exemplary embodiments illustrated in the drawings, in which.

The reference symbols used in the figures and their meanings are listed in summary form in the list of reference symbols. In principle, identical or similar parts are provided with the same reference symbols.

DETAILED DESCRIPTION

Exemplary embodiments of the present disclosure provide a converter having maintenance-friendly and reliable converter cells.

An exemplary embodiment of the present disclosure provides a bridging unit for shorting a first input and a second input of a converter cell of a modular converter.

According to an exemplary embodiment, the converter may be a power converter, which is configured to convert currents of several tens or several hundreds of amperes, and several thousand volts. In this case, the term "conversion" means the process in which an AC voltage is produced from a DC voltage, a DC voltage is produced from an AC voltage, and/or an AC voltage at a second frequency is produced from an AC voltage at a first frequency. The converter may be a modular multi-level converter (M2LC), an indirect converter or a direct converter. These two types of converters are often also referred to as chainlink converters, since their converter cells are arranged in the form of a chain.

A converter cell may be a unipolar cell (a half-bridge), for example in the case of an indirect M2LC converter, or else may be a bipolar cell (a full-bridge), for example in the case of a direct M2LC converter or a chainlink converter. A converter cell generally has a plurality of electronic switches, such as thyristors or IGBTs. Furthermore, a converter cell has an energy store, such as a capacitor, for example. A plurality of converter cells can be connected in series via their inputs to form a converter.

According to an exemplary embodiment of the present disclosure, the bridging unit includes a bistable mechanical relay, which is configured to electrically connect the first input to the second input, and/or to interrupt the connection again. A bistable mechanical relay does not change its present switching state when its control input is disconnected.

According to an exemplary embodiment of the present disclosure, the bridging unit includes a power-electronic switch. The power-electronic switch can be configured to electrically connect the first input to the second input of the converter cell, and to interrupt the connection again.

A power-electronic switch can switch several orders of magnitude faster than a relay. For example, the bridging unit can simultaneously send a control signal to the power-electronic switch and the bistable mechanical relay, in response to which the power-electronic switch closes first of all after a very short time period (microseconds), and the bistable mechanical relay then closes (milliseconds).

According to an exemplary embodiment of the present disclosure, the power-electronic switch is configured to close within a few microseconds to a few tens of microseconds.

According to an exemplary embodiment of the present disclosure, the bistable mechanical relay is configured to close within a few milliseconds to a few tens of milliseconds.

Even if the converter cell loses the internal feed after a certain amount of time, for example because the bridging unit has been closed, the bistable mechanical relay remains in its closed state.

The bridging unit can be designed using simple technology. No pyrotechnic make contacts or vacuum interrupters are required. Because of the bistable mechanical relay, the bridging unit remains safely in a stable state after operation, even without external power. Since the bistable mechanical relay and the power-electronic switch can be configured to be resettable, the bridging unit can also be configured to be resettable. Furthermore, the bridging unit with the converter cell can be connected in parallel with its inputs, in contrast to broken-down semiconductor components. In addition, the bridging unit can allow bipolar overvoltage limiting for a high-impedance converter cell.

Furthermore, a multiplicity of fault situations at the converter level can be covered by the bridging unit, including ground faults and shorts, for example. In addition, the bridging unit can offer a redundant path, for example for a DC link shorting path.

According to an exemplary embodiment of the present disclosure, the power-electronic switch comprises two back-to-back parallel thyristors. More generally, it is also possible for the bridging unit to comprise at least one thyristor.

According to an exemplary embodiment of the present disclosure, the power-electronic switch includes a triac.

According to an exemplary embodiment of the present disclosure, the bridging unit includes an energy store in order to supply power to the drive, the mechanical relay and the power-electronic switch. An energy store such as this may, for example, be a capacitor which, for example, can be charged directly or indirectly via the voltage applied to the converter cell. It may also be possible for the energy store or the capacitor to be specifically charged further by an overvoltage on the converter cell.

According to an exemplary embodiment of the disclosure, the bridging unit includes a drive for switching the bistable mechanical relay and the power-electronic switch.

According to an exemplary embodiment of the present disclosure, the drive is configured to receive a closing or reset signal for the relay and/or the power-electronic switch, and to close or to open the relay and/or the power-electronic switch (that is to say to reset them) in reaction to the closing signal or the reset signal.

According to an exemplary embodiment of the present disclosure, the drive is configured to determine an overvoltage and/or an overcurrent between the first input and the second input of the converter cell. By way of example, this can be done by the drive receiving measurement signals from a voltage measurement unit and a current measurement unit at the first and/or second output of the converter cell, and by processing them further.

According to an exemplary embodiment of the present disclosure, the drive is configured to close the relay and/or the power-electronic switch when the overvoltage and/or the overcurrent are/is determined. For example, the drive can close the two switching elements when the voltage between the first input and the second input exceeds a predetermined threshold value. In the same way, the drive can close the two switching elements when a current in the first input and/or second input exceeds a predetermined threshold value.

According to an exemplary embodiment of the present disclosure, the bridging unit is driven by passive overvoltage detection between inputs X1 and X2. In this case, passive overvoltage detection can mean an electronic component which changes its internal state solely as a result of the presence of the overvoltage. Examples of components such as these are transil diodes and suppressor diodes.

By way of example, the passive overvoltage detection could include at least one suppressor diode or could include a suppressor chain composed of series-connected suppressor diodes. Suppressor diodes start to conduct at a specific threshold voltage, and a chain of suppressor diodes can therefore be used to select a threshold voltage at which the chain starts to conduct.

According to an exemplary embodiment of the present disclosure, a chain of series-connected suppressor diodes, which are chosen such that they start to conduct at a predetermined threshold voltage, produce an appropriate signal, in order to switch the bistable mechanical relay and/or the power-electronic switch in the bridging unit.

According to an exemplary embodiment of the present disclosure, if the overvoltage is exceeded, the energy store is charged or additionally charged by the overvoltage.

According to an exemplary embodiment of the present disclosure, the drive has a further electronic switch, which is closed when a voltage on the energy store exceeds a predefined value, and the drive supplies current from the energy store to the bistable relay and/or to the power-electronic switch.

According to an exemplary embodiment of the present disclosure, the drive has hysteresis, such that, if the voltage on the energy store is undershot, the relay and/or the power-electronic switch are/is still supplied with current from the energy store. By way of example, the relay can be supplied with current and voltage from the energy store when the voltage on the energy store exceeds a specific value, which ensures that the relay is supplied with current until it was able to change to the open state or the closed state. The relay is then supplied with voltage from the energy store until the voltage on the energy store undershoots a specific value and disconnects the energy store again, by means of the relay. By way of example, hysteresis and threshold-value determination for the voltage on the energy store may be achieved by means of a diac, which is connected in series with a suppressor diode.

According to an exemplary embodiment of the present disclosure, the drive for the bridging unit is configured (for example, in addition to the overvoltage closing signal) to receive or to detect an external closing signal and/or reset signal. This external closing signal may originate from the diagnosis unit of the converter cell, or from a system protection unit of the converter.

According to an exemplary embodiment of the present disclosure, the drive is configured to close the relay and/or the power-electronic switch when an external closing signal has been detected.

According to an exemplary embodiment of the present disclosure, the drive is configured to open the relay and/or the power-electronic switch when an external reset signal has been detected.

Another exemplary embodiment of the present disclosure provides a converter cell. The converter cell can include a bridging unit as described above and in the following text.

According to an exemplary embodiment of the present disclosure, the converter cell includes a diagnosis unit which is configured to transmit a closing signal and/or a reset signal for the bridging unit. Furthermore, the diagnosis unit may supply important measurement and state variables to the central converter and system control.

According to an exemplary embodiment of the present disclosure, the converter cell includes an overcurrent disconnection unit, which may be an overcurrent disconnection device which acts independently of the bridging unit. For example, the overcurrent disconnection unit can disconnect the semiconductors in the converter cell in the event of an overvoltage and/or an overcurrent.

According to an exemplary embodiment of the present disclosure, the converter cell can automatically interrupt the fault current in the active switches in the converter cell (IGBTs, IGCTs) within microseconds in the event of a pronounced overcurrent (or a surge current).

According to an exemplary embodiment of the present disclosure, the converter cell includes desaturation monitoring of an IGBT in the converter cell. Faults or problems such as these can be identified on the basis of desaturation monitoring of IGBTs or transistors. However, it can also be based on very rapid overcurrent detection in the case of IGCTs or other elements which can be turned off.

Another exemplary embodiment of the present disclosure provides a converter. The converter can include a plurality of converter cells, as described above and in the following text.

According to an exemplary embodiment of the present disclosure, the converter includes a system protection unit. The system protection unit can be configured to close all or a selection of the power-electronic switches and/or the relay in the bridging units of the converter cells in the event of a converter and/or system fault, and to selectively reset them again after the fault has been rectified (that is to say, to open). The system protection unit is configured to transmit a bridging signal and/or a reset signal to each converter cell from the plurality of converter cells. In certain fault situations, rapid and autonomous disconnection at the converter cell level is not sufficient, and the system protection unit sends a coordinated bridging signal to all the cells, or selected cells.

An exemplary embodiment of the present disclosure provides a method for shorting a converter cell.

According to an exemplary embodiment of the present disclosure, the method includes the steps of: receiving or determining a closing signal by a drive unit, for example on the basis of the identification of an overvoltage and/or an overcurrent at the inputs of the converter cell or of an external signal; closing of a power-electronic switch by the drive unit in reaction to the closing signal; closing of a bistable mechanical relay by the drive unit in reaction to the closing signal; receiving power from an energy store (for example a local energy store) in order to close the power-electronic switch and/or the bistable relay.

In this case, the closing signal may be emitted from the drive unit at the same time for the power-electronic switch and the bistable relay, in response to which the power-electronic switch then starts to conduct in the millisecond range, but the bistable relay reacts only after milliseconds.

According to an exemplary embodiment of the present disclosure, the method can also include the step of charging of the energy store by a voltage supply for the converter cell during normal operation or charging of the energy store from an (over)voltage at the inputs of the converter cell.

According to an exemplary embodiment of the present disclosure, the method can also include the step of opening of the bistable relay and/or the power-electronic switch in reaction to a reset signal.

Overall, it should also be understood that the described modules, such as the control, the diagnosis unit and the drive, may be implemented by functional modules of a processor of a computing device executing programmed software recorded on a non-transitory computer-readable recording medium. However, it is possible for these functional modules also to be implemented partially or entirely as hardware.

A further aspect of the present disclosure also relates to a non-transitory computer-readable recording medium having a program recorded thereon that causes a processor of a computing device to the method described above and in the following text.

In this case, a computer-readable recording medium may be a floppy disk, a CD, a DVD, a hard disk, a USB memory device, an RAM, an ROM, an EPROM, an EEPROM or a Flash-PROM. It is to be understood that various components of the recorded program can be received by a data communication network, such as the Internet, which allows program code to be downloaded and stored on the non-transitory computer-readable recording medium.

Exemplary embodiments of the disclosure will be described in detail in the following text with reference to the attached drawings.

Figures 1, 2, 3, 4:
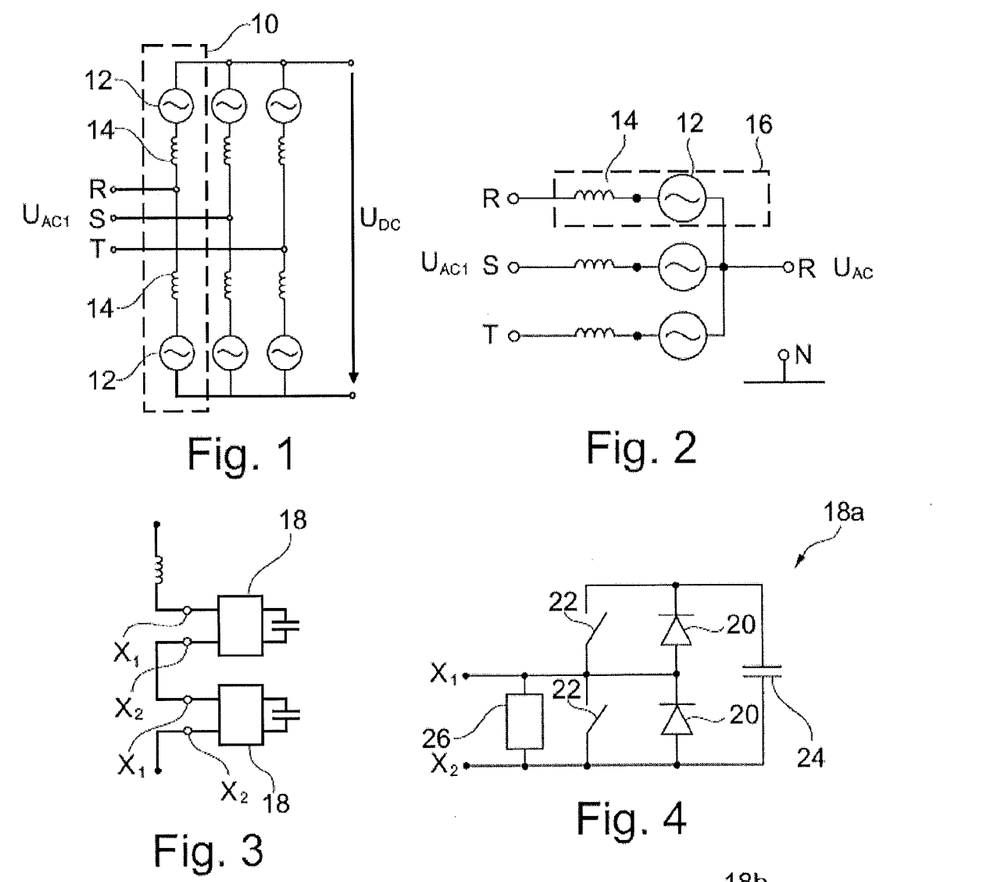
FIG. 1 shows a converter according to an exemplary embodiment of the present disclosure
FIG. 2 shows a converter according to an exemplary embodiment of the present disclosure
FIG. 3 shows a chain of converter cells according to an exemplary embodiment of the present disclosure.
FIG. 4 shows a unipolar converter cell according to an exemplary embodiment of the present disclosure.

FIG. 1 shows an indirect converter 10, which can convert a DC voltage $U_{DC}$ to an AC voltage $U_{AC}$, according to an exemplary embodiment of the present disclosure. For this purpose, the indirect converter 10 has two converter branches 12, which connect the inputs of the indirect converter 10, between which the voltage $U_{DC}$ is applied, to an output, at which the voltage $U_{AC}$ is produced, in each case via an inductor 14. The converter branches 12 each comprise a plurality of series-connected converter cells.

The indirect converter 10 illustrated in FIG. 1 is configured to convert one phase of a current. Converters are also known which can convert a current having a plurality of phases, for example polyphase (as is illustrated in FIG. 1). These converters have one converter 10 for each phase R, Y, B, whose outputs are respectively associated with one of the phases, and whose inputs are respectively associated with the inputs, of the other converters.

FIG. 2 shows a direct converter which produces an output voltage $U_{AC2}$ at the frequency 2 from input voltages $U_{AC1}$ of the three input phases R, Y, B at the frequency 1, according to an exemplary embodiment of the present disclosure. The direct converter 16 is able to connect a phase voltage of $U_{AC1}$ at a first frequency to a phase voltage of $U_{AC2}$. For this purpose, the direct converter 16 once again has a converter branch 12 which connects the two inputs, to which the two voltages $U_{AC1}$ and $U_{AC2}$ are applied, via an inductor 14. A plurality of output voltages $U_{AC2}$ at the frequency 2 can be produced in a corresponding manner, for example, for polyphase $U_{AC2}$ systems. The output voltage $U_{AC2}$ can also be correspondingly kept in the vicinity of 0, for example, to provide power-factor correction devices.

FIG. 3 shows a converter branch 12 including a plurality of converter cells 18, according to an exemplary embodiment of the present disclosure. Each of the converter cells 18 has a first input X1 and a second input X2 which are connected either to the input and output of the converter branch 12 or to a further converter cell 18. The converter cells 18 are connected in series via their inputs and outputs X1, X2.

FIG. 4 shows a unipolar converter cell 18a which is used in the converter branches 12 of the indirect converter 10 shown in FIG. 1, according to an exemplary embodiment of the present disclosure. The converter cell 18a has two freewheeling diodes 20, two power-electronic switches 22, an energy store 24 in the form of a capacitor, for example, and a bridging unit 26. By way of example, the power-electronic switches 22 may be thyristors, IGCTs or IGBTs. The bridging unit 26 is connected in parallel with the other components of the converter cell 18a, and is connected to the inputs X1 and X2 of the converter cell 18a.

In principle, the bridging unit 26 is a component which has a very low impedance in a first switched-on state, such that a current between the inputs X1 and X2 flows through the bridging unit 26 and not through the other physical components of the converter cell 18a. In a second, switched-off, state, in which the bridging unit 26 has a very high impedance, no current, or only a very small current, can flow through the bridging element 26. In this situation, the converter cell 18a behaves as if the bridging unit 26 were not present.

Figure 5:
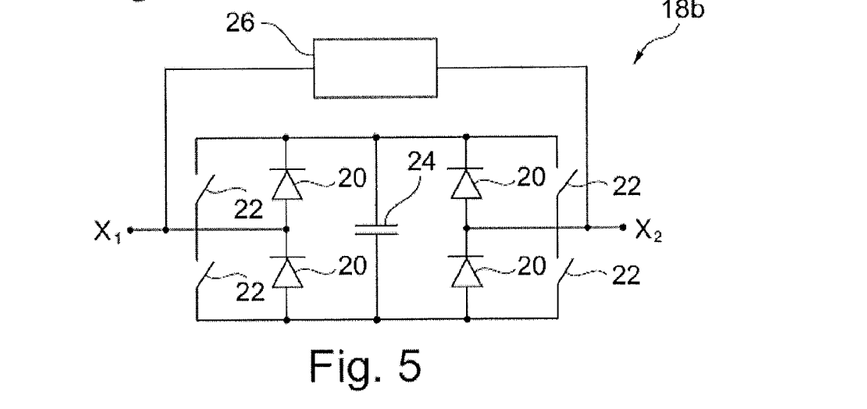
FIG. 5 shows a bipolar converter cell according to an exemplary embodiment of the present disclosure.

FIG. 5 shows a bipolar converter cell 18b which is formed in principle from two unipolar converter cells 18a, which share the same energy store 24, according to an exemplary embodiment of the present disclosure. The bipolar converter cell 18b may be used in a direct converter 16. Furthermore, the bipolar converter cell 18b has four power-electronic switches 22 and four freewheeling diodes 20. By way of example, the power-electronic switches 22 may be thyristors, IGCTs or IGCTs. Furthermore, the converter cell 18b also has a bridging unit 26, which is connected in parallel with the other components of the converter cell 18b, and is connected in parallel with the inputs X1 and X2 of the converter cell 18b. In this case, the bridging element 26 has the same characteristics as the bridging element 26 shown in FIG. 4. Furthermore, a small inductance can be fitted between the unipolar or bipolar converter cell and the bridging element 26.

Alternatively, two bridging units can be used for a bipolar converter cell, which each connect one external connection (X1, X2) to the same connection of the capacitor. The bipolar cell then corresponds precisely to two unipolar cells which were connected to the two connections of the capacitor.

Figure 6:
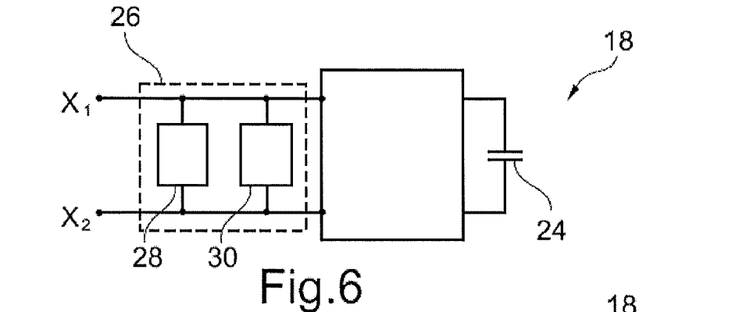
FIG. 6 shows a converter cell according to an exemplary embodiment of the present disclosure.

FIG. 6 shows a converter cell 18 which may be a unipolar converter cell 18a or a bipolar converter cell 18b, according to an exemplary embodiment of the present disclosure. In this case, the bridging unit 26 has two components which are connected in parallel with one another, a surge-current element 28 and a redundant element 30.

The surge-current element 28 provides the resistance of the converter cell 18 to surge currents. By way of example, externally applied surge currents, in the event of various converter faults or external system faults, are absorbed briefly via the inputs X1 and X2 by the converter cell, with the aid of the surge-current element 28. Furthermore, the same protection element can also be used to absorb cell-internal surge currents, for protection of the redundant elements. By way of example, this is possible in order to discharge the intermediate circuit with the capacitor 24 when, for example, the power-electronic switch 22 illustrated at the top in FIG. 4, is closed in the case of the unipolar converter cell 18a.

The redundant element 30 provides the redundancy capability for the converter cell 18. In this case, redundancy capability of a converter cell means a permanent shorting of the cell as a consequence of a cell malfunction.

Figure 7:
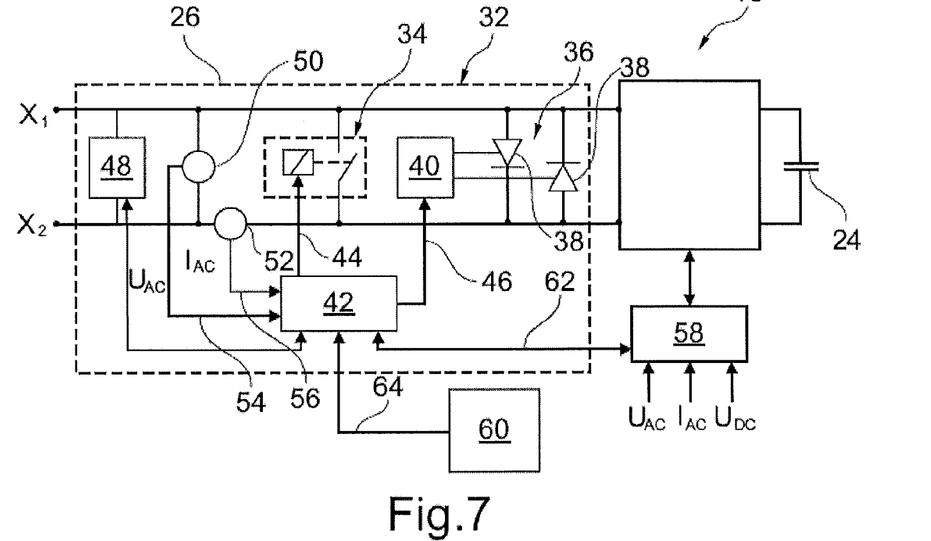
FIG. 7 shows a converter cell according to an exemplary embodiment of the present disclosure.

FIG. 7 shows another exemplary embodiment of a bridging unit 26. An intelligent, combined mechanical and power-electronic bridging unit 26 is inserted between the inputs and outputs X1 and X2 of a unipolar or bipolar converter cell 18, making it possible to ensure controlled provision of redundancy (e.g., failure of one or more converter cells 18) and the capability to carry surge currents in the event of external system faults.

The bridging unit 26 includes a combined mechanical-electrical bridging element 32 formed from a bistable mechanical relay 34 and a power-electronic switch 36, which includes two two-to-back thyristors 38 or a triac. The power-electronic switch 36 has a gate control 40 or gate drive 40, which can switch the electronic switching elements 38, for example thyristors 38, via their gates. The combined mechanical-electrical bridging element 32 is driven by a drive 42, which can send an opening or closing signal via a first signal line 44 to the mechanical relay 34, and an opening or closing signal via a second signal line 46 to the gate control 40, and therefore to the power-electronic switch 36.

The drive 42 and the components of the bridging element 32, that is to say the relay 34, the gate control 40 and the two thyristors 38, are supplied with power from an energy store 48. The energy store 48 is configured to provide sufficient power to supply power in the event of a fault to the mechanical and power-electronic bridging element 32, as well as its associated protection intelligence, in the form of the drive 42. The energy store 48 is connected in parallel with the relay 34 and the two thyristors 36 to the inputs X1 and X2 of the converter cell 18, and can draw power from the voltage which is applied to the converter cell 18 via these two inputs X1, X2. However, it is also possible for the energy store 48 to draw power from a power supply for the converter cell 18.

The mechanical relay 34, which may be a commercially-available mechanical relay, for example, is connected to the outputs X1 and X2 can be operated with the control voltage applied on switch-on. This makes it possible to shorten the switching time of the relay 34. Furthermore, the relay 34 can be operated with the switching voltage on the contacts, provided that it is possible to comply with the functional isolation separations required. The relay 34 may be a commercially-available bistable relay.

The drive 42 is configured to implement external protection commands which, for example, originate from a system protection unit 60, to evaluate local faults, such as an over-voltage, an overcurrent, or a fault message from the converter cell diagnosis 58, for example. For this purpose, a voltage measurement device 50 can be connected between the two inputs X1, X2, and/or a current measurement device 52 can be connected in the input X1 or the input X2. The drive 42 can receive the instantaneous voltage $U_{AC}$ between the inputs X1 and X2 from the voltage measurement device 50 via a signal line 54, and can receive the instantaneous current $I_{AC}$ from the current measurement device 52 via the signal line 56.

Furthermore, the drive 42 can receive opening and closing signals via a signal line 62 from a control and diagnosis unit 58 for the converter cell 18. By way of example, in order to determine faults in the converter cell 18, the control and diagnosis unit 58 can receive the values of the voltage $U_{AC}$, of the current $I_{AC}$, of the voltage $U_{DC}$ and of the desaturation monitoring (in the case of IGBTs) or through-conduction of the cell (in the case of IGCTs). The drive 42 can optionally also send a disconnection signal to the control 58 for the converter cell 18, via the signal line 62.

Furthermore, it is possible for the drive 42 to receive opening and closing signals from a system protection unit 60, which monitors the entire converter 10, 16 in which the converter cell 18 is installed.

Figure 8:
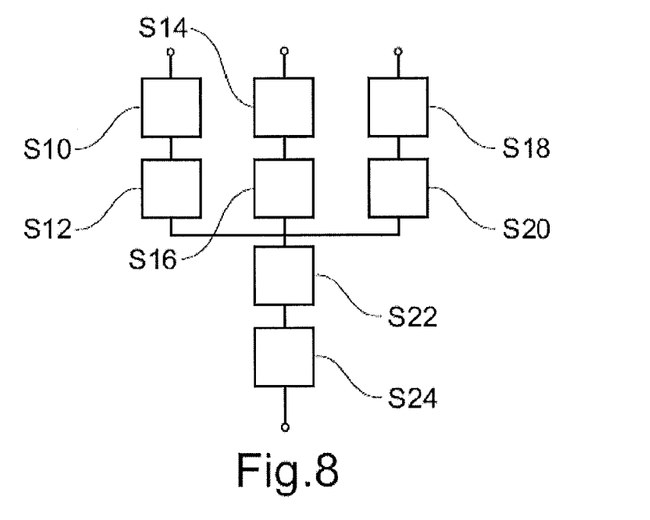
FIG. 8 shows a flowchart for a method for shorting a converter cell according to an exemplary embodiment of the present disclosure.

FIG. 8 shows a flowchart for a method by means of which the bridging unit 26 can protect the converter cell 18, according to an exemplary embodiment of the present disclosure.

The voltage $U_{AC}$ and/or the current $I_{AC}$ between the two inputs X1, X2 of the converter cell 18 are/is determined in step S10.

In step S12, the drive 42 determines whether a threshold value for the voltage $U_{AC}$ and/or the current $I_{AC}$ has been exceeded. If the threshold value has been exceeded, the drive 42 decides to close the mechanical-electrical bridging element 32.

In step S14, the control and diagnosis unit 58 determines an internal fault in the converter cell 18. In step S16, the control and diagnosis unit 58 sends a closing signal to the drive 42.

In step S18, the system protection unit 60 detects an external or internal fault in the converter 10, 16. The system protection unit 60 then sends a closing signal via the signal line 62 to the drive 42.

Steps S10 and S12, S14 and S16 as well as steps S18 and S20 as shown in FIG. 8 can be carried out alternatively to one another, or else simultaneously.

In step S22, taking account of all the information, the drive 42 optionally sends a closing signal via the signal line 44 to the relay 34, which closes within milliseconds, and a closing signal via the signal line 46 to the gate control 40, which then switches on the two thyristors 38. The thyristors 38 start to conduct within microseconds, for example.

If the control and diagnosis unit 58 or the system protection unit 60 detects that the internal fault has been rectified or that the internal or external fault of the converter 10, 16 is no longer present, the control and diagnosis unit 58 sends an opening signal to the drive 42, which then, in step S24, sends an opening signal to the relay and/or the gate control 40, in response to which the selected switching elements 34 and/or 36 are opened again, and, if appropriate, the bridging of the bridging element 26 is disconnected again.

An external fault, which can be detected by the system protection unit 60, may, for example, be a ground fault. In the case of a ground fault, or in general in the case of a fault which is detected by the system protection unit 60, a closing signal is sent to all the bridging units 26 in all the converter cells 18 in the converter 18. In these situations, the indication is to close only the power-electronic switches. This leads to all the converter cells 18 in the converter being bridged by the bridging unit 26. Furthermore, in this case, the main interrupters in the converter 10, 16 are also activated by the system protection unit 60.

Figure 9:
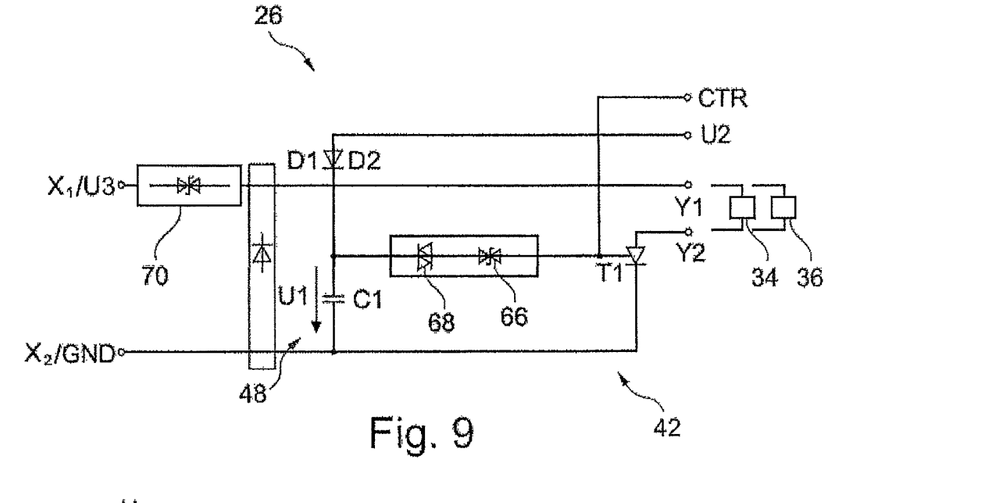
FIG. 9 shows a bridging unit according to an exemplary embodiment of the present disclosure.

FIG. 9 shows an exemplary embodiment of a part of a bridging unit 26 according to the present disclosure. One or more bistable relays 34 and/or one or else more gate controls 40 for power-electronic switches 36 can be driven via the outputs Y1 and Y2 of the circuit 26 illustrated in FIG. 9. The input U3 of the circuit 26 is connected to the input X1 of the converter cell 18, and the input GND is connected to the output X2 of the converter cell 18.

The power which is required for simultaneous switching (for example of one or more bistable relays 34 and/or one or more power-electronic switches 36) is set in a capacitor C1 via the voltage or the capacitance. The energy store 48 includes the capacitor C1 according to the illustrated exemplary embodiment.

The circuit from Y1 via the capacitor C1 to the output Y2 is closed by a thyristor T1, in order to trip the relay 34 and/or the gate control 40. This results in the current flowing out of the capacitor C1 after a trigger pulse until the capacitor C1 has been completely discharged, or the circuit is interrupted.

The power for the energy store 48 is taken either from the voltage supply associated with the converter cell via the input U2 or via a series circuit of transil or suppressor diodes 70 (and followed by rectification), from the voltage which is applied to the inputs X1, X2 of the converter cell (that is to say in parallel with the relay contacts of the relay 34 or in parallel with the thyristors 38).

The thyristor T1 can be triggered either via an excessively high voltage at the input U3 or X1 of the circuit 26, or via a control input CTR.

In order to trigger the thyristor T1 via the control input CTR to which, for example, the diagnosis unit 58 and/or the system protection unit 60 can be connected, the charge and therefore the voltage U1 on the capacitor C1 is kept at the value of the voltage U2 by means of the power supply unit which is integrated in the control unit 58, 60. As soon as the control unit 58, 60 produces the command or the closing signal bridges the converter cell 18, the control connection of the thyristor T1 is driven directly via the input CTR, and the thyristor T1 is therefore switched on. In consequence, the capacitor C1 is discharged via the connected bistable relay 34 or the gate controls 40.

In order to trigger the thyristor T1 via an excessively high voltage U3, the voltage U1 across the capacitor C1 is tapped off, and is connected to the control connection of the thyristor T1 via a series circuit of zener diodes 66 or transil diodes 66 and a diac 68. The series circuit 66, 68 results in a current flowing into the control connection of the thyristor T1, and triggering it, above a specific threshold voltage U1. At the same time, the diac 68 changes its pass characteristic such that the voltage drop across it decreases to a major extent. This increases the drive current for the thyristor T1 and adds hysteresis to the trip circuit 26. This results in reliable tripping when the threshold voltage U1 is exceeded just once.

According to an exemplary embodiment, the drive 42 includes the above-mentioned elements 66, 68 and T1.

The transil chain 70, which includes one or more series-connected transil diodes, makes it possible to set the threshold voltage for charging the capacitor C1. The threshold voltage in the block 66, 68 should be higher than the voltage U2, otherwise the triggering mechanism of the threshold circuit 26 will be activated even during normal operation, when the power supply unit for the connected converter cell 18 is supplying the voltage U2.

Figure 10:
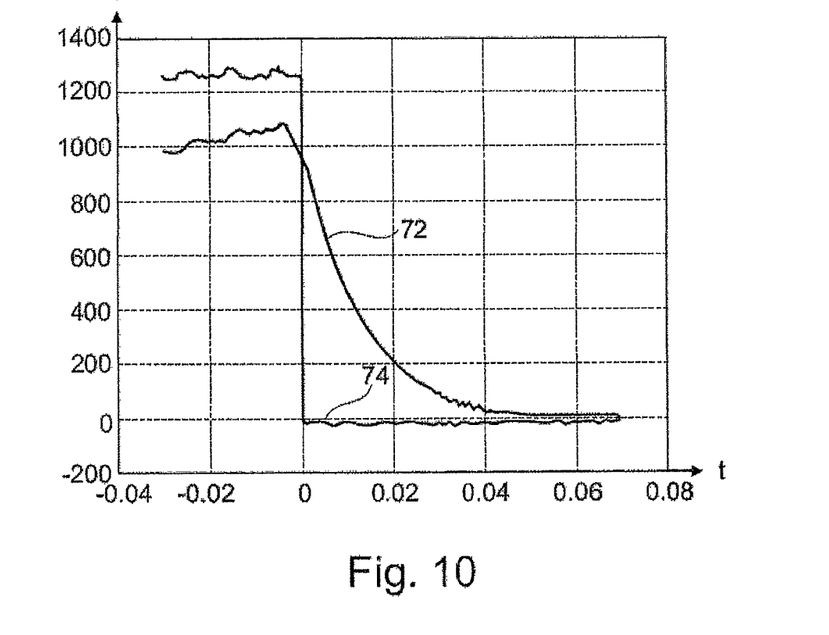
FIG. 10 shows a diagram with voltage profiles for the bridging unit as shown in FIG. 9, according to an exemplary embodiment of the present disclosure.

FIG. 10 shows a diagram of voltage profiles which were obtained for a measurement on the exemplary bridging circuit 26 as shown in FIG. 9. The time t is plotted in seconds to the right, and the voltage is plotted in volts upwards, on the diagram. In this case, the capacitor voltage 72 must be divided by 10.

The graph 72 shows the voltage profile across the capacitor C1, during which the voltage U3 74 was increased continuously, up to a threshold voltage at which the transil chain 70 starts to conduct and the capacitor C1 is charged, as soon as the threshold voltage for triggering of the thyristor T1 was reached, shorting the voltage U3 and thus bridging the converter cell 18.

It should be understood that the bridging circuit 26 illustrated in FIG. 9 can also be used to bridge general power-electronic components, and not only a converter cell 18. For this purpose, the bridging circuit 26 can be connected via the inputs U3 and GND to the inputs of the power-electronic component, and/or can be connected to a power supply unit via the input U2.

In addition, it should be noted that the terms "including" and "comprising" as used herein do not exclude any other elements or steps, and "one", "a" or "an" does not exclude any multiple of the described element. Furthermore, it should be noted that features or steps which have been described with reference to one of the above exemplary embodiments can also be used in combination with other features or steps of other exemplary embodiments described above.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

10 Indirect converter
12 Converter branch
14 Inductor
16 Direct converter
18 Converter cell
18a Unipolar converter cell
18b Bipolar converter cell
20 Freewheeling diode
22 Power-electronic switch
24 Energy store
26 Bridging unit
28 Surge-current element
30 Redundant element
32 Bridging element
34 Relay
36 Electronic switch
38 Thyristor
40 Gate control
42 Drive
44 Signal line
46 Signal line
48 Energy store
50 Voltage measurement device
52 Current measurement device
54 Signal line
56 Signal line
58 Control/diagnosis unit
60 System protection unit
62 Signal line
64 Signal line
66 Transil diode
68 Diac
70 Transil chain
72 Capacitor voltage
74 Voltage between X1 and X2

What is claimed is:

1. A bridging unit for shorting a first input and a second input of a converter cell of a modular converter, the bridging unit comprising:
   a bistable mechanical relay;
   a power-electronic switch;
   a drive for switching the relay and the power-electronic switch; and
   an energy store for supplying power to the mechanical relay, the power switch and the drive;
   wherein the bistable mechanical relay is configured to electrically connect the first input to the second input;
   wherein the power-electronic switch is configured to electrically connect the first input to the second input;
   wherein the drive comprises passive overvoltage detection configured to charge the energy store if the overvoltage is exceeded;
   wherein the drive has a further electronic switch, which is configured to be closed when a voltage on the energy store exceeds a predefined value, and the drive is configured to supply current from the energy store to at least one of the bistable relay and the power-electronic switch, and
   wherein the drive has hysteresis, such that, if the voltage on the energy store is undershot, at least one of the relay and the power-electronic switch is still supplied with current from the energy store.

2. The bridging unit as claimed in claim 1,
   wherein the power-electronic switch is configured to close within a few microseconds to a few tens of microseconds, and
   wherein the bistable mechanical relay is configured to close within a few milliseconds to a few tens of milliseconds.

3. The bridging unit as claimed in claim 1,
   wherein the power-electronic switch comprises two back-to-back parallel thyristors, and
   wherein the power-electronic switch comprises a triac.

4. The bridging unit as claimed in claim 1,
   wherein the drive is configured to receive a closing signal, and wherein the drive is configured to close at least one of the relay and the power-electronic switch in reaction to the closing signal.

5. The bridging unit as claimed in claim 1,
wherein the drive is configured to receive a reset signal, and
wherein the drive is configured to open at least one of the relay the power-electronic switch in reaction to the reset signal.

6. The bridging unit as claimed in claim 1,
wherein the drive is configured to determine at least one of an overvoltage and an overcurrent between the first input and the second input, and
wherein the drive is configured to close at least one of the relay and the power-electronic switch when at least one of the overvoltage and the overcurrent is determined.

7. The bridging unit as claimed in claim 1,
wherein the drive is configured to detect at least one of an external closing signal and a reset signal,
wherein the drive is configured to close at least one of the relay and the power-electronic switch when an external closing signal has been detected, and
wherein the drive is configured to open at least one of the relay and the power-electronic switch when an external reset signal has been detected.

8. A converter cell, comprising:
a bridging unit as claimed in claim 1.

9. The converter cell as claimed in claim 8, comprising:
an overcurrent disconnection unit; and
an desaturation monitoring unit of an IGBT in the converter cell,
wherein the overcurrent disconnection unit is configured to disconnect semiconductor elements in the converter cell in the event of an overcurrent.

10. A converter comprising:
a plurality of converter cells as claimed in claim 8.

11. The converter as claimed in claim 10, comprising:
a system protection unit;
wherein the system protection unit is configured to close power-electronic switches in the bridging units of the converter cells in the event of at least one of a converter and system fault, and to selectively reset the power-electronic switches again after the fault has been rectified.

12. The bridging unit as claimed in claim 1,
wherein the power-electronic switch is configured to close within a few microseconds to a few tens of microseconds.

13. The bridging unit as claimed in claim 1,
wherein the bistable mechanical relay is configured to close within a few milliseconds to a few tens of milliseconds.

14. The bridging unit as claimed in claim 2,
wherein the power-electronic switch comprises two back-to-back parallel thyristors, and
wherein the power-electronic switch comprises a triac.

15. The bridging unit as claimed in claim 1,
wherein the power-electronic switch comprises two back-to-back parallel thyristors.

16. The bridging unit as claimed in claim 1,
wherein the power-electronic switch comprises a triac.

17. The bridging unit as claimed in claim 14,
wherein the drive is configured to receive a closing signal, and wherein the drive is configured to close at least one of the relay and the power-electronic switch in reaction to the closing signal.

18. The bridging unit as claimed in claim 4,
wherein the drive is configured to receive a reset signal, and
wherein the drive is configured to open at least one of the relay the power-electronic switch in reaction to the reset signal.

19. The bridging unit as claimed in claim 18,
wherein the drive is configured to determine at least one of an overvoltage and an overcurrent between the first input and the second input, and
wherein the drive is configured to close at least one of the relay and the power-electronic switch when at least one of the overvoltage and the overcurrent is determined.

20. A converter cell, comprising:
a bridging unit as claimed in claim 19.

21. The converter cell as claimed in claim 20, comprising:
an overcurrent disconnection unit,
wherein the overcurrent disconnection unit is configured to disconnect semiconductor elements in the converter cell in the event of an overcurrent.

22. A converter comprising:
a plurality of converter cells as claimed in claim 21.

23. A method of shorting a converter cell of a modular converter with a bridging unit, wherein the bridging unit includes a bistable mechanical relay for electrically connecting first and second inputs of the converter cell, a power-electronic switch for electrically connecting the first and second inputs, a drive for switching the relay and the power-electronic switch, and an energy store for supplying power to the mechanical relay, the power switch and the drive, and wherein the method comprises:
receiving or determining a closing signal by the drive on the basis of the identification of at least one of an overvoltage and an overcurrent at the inputs of the converter cell or of an external signal;
closing the power-electronic switch by the drive in reaction to the closing signal;
closing the bistable mechanical relay by the drive in reaction to the closing signal;
receiving power from the energy store to close at least one of the power-electronic switch and the bistable mechanical relay.

24. The method of claim 23, wherein the closing signal is emitted from the drive at substantially the same time for the power-electronic switch and the bistable relay, and
wherein, in response to the emitted closing signal, the power-electronic switch starts to conduct in the millisecond range, while the bistable relay reacts after milliseconds.

25. The method of claim 23, comprising:
charging the energy store by at least one of a voltage supply for the converter cell during operation, and by an overvoltage at the inputs of the converter cell.

26. The method of claim 23, comprising:
opening at least one of the bistable relay and the power-electronic switch in response to the drive receiving a reset signal.

27. A non-transitory computer-readable medium having a computer program recorded thereon that causes a processor of a computing device to carry out the method of claim 23.

* * * * *